US008082564B2

(12) United States Patent
Wang et al.

(10) Patent No.: US 8,082,564 B2
(45) Date of Patent: Dec. 20, 2011

(54) METHOD FOR CREATING A SUBSCRIBER CABLE CHANNEL AND SET-TOP BOX FOR USE THEREWITH

(75) Inventors: Feng Chi Wang, Austin, TX (US);
Philip Poulidis, Oakville (CA)

(73) Assignee: Morega Systems Inc., Mississauga, Ontario (CA)

( * ) Notice: Subject to any disclaimer, the term of this patent is extended or adjusted under 35 U.S.C. 154(b) by 765 days.

(21) Appl. No.: 11/821,553

(22) Filed: Jun. 22, 2007

(65) Prior Publication Data

US 2008/0320534 A1    Dec. 25, 2008

(51) Int. Cl.
*H04N 7/10* (2006.01)
*H04N 7/18* (2006.01)
*H04N 7/173* (2011.01)
*H04N 5/222* (2006.01)
*G06Q 30/00* (2006.01)

(52) U.S. Cl. ............... 725/32; 725/34; 725/36; 725/74; 725/110; 705/14.4; 705/14.49; 705/14.67; 705/14.72; 348/722

(58) Field of Classification Search ............ 725/32, 725/34, 36, 74, 110; 705/14.4, 14.67, 14.72, 705/14.49; 348/722
See application file for complete search history.

(56) References Cited

U.S. PATENT DOCUMENTS

| | | | |
|---|---|---|---|
| 2002/0147975 A1* | 10/2002 | Seo | 725/39 |
| 2003/0226142 A1* | 12/2003 | Rand | 725/32 |
| 2004/0031058 A1* | 2/2004 | Reisman | 725/112 |
| 2005/0246757 A1* | 11/2005 | Relan et al. | 725/135 |
| 2008/0196060 A1* | 8/2008 | Varghese | 725/34 |
| 2008/0201311 A1* | 8/2008 | Ertugrul et al. | 707/4 |

* cited by examiner

*Primary Examiner* — Hoang-Vu A Nguyen-Ba
(74) *Attorney, Agent, or Firm* — Garlick Harrison & Markison; Bruce E. Stuckman (57) ABSTRACT

Media content is received from at least one external device that is coupled to a set-top box. Subscriber channel content is generated based on the media content. The subscriber channel content is transferred to a cable network to produce a subscriber cable channel.

22 Claims, 9 Drawing Sheets

My Channel Selections

Content
○ audio
○ video
◉ audio/video

Ads
○ no ads
○ choose my own
◉ allow us to insert ads

Privacy
◉ public channel
○ private channel
_________________
(insert password)

Channel Name
Bob's Lakefront
(insert name)

| Channel # | Channel |
|---|---|
| 1172 | Bob's Lakefront |
| 1173 | Rose's Garden (Password: |
| 1174 | Cable Man from Michigan |
| ••• | ••• |

METHOD FOR CREATING A SUBSCRIBER CABLE CHANNEL AND SET-TOP BOX FOR USE THEREWITH

TECHNICAL FIELD OF THE INVENTION

The present invention relates to transfer of media content and related methods used in devices such as set-top boxes and other home media gateways.

DESCRIPTION OF RELATED ART

The number of households having multiple television sets is increasing, and many users want the latest and greatest video viewing services. Cable networks provide a number of channels choices to subscribers including traditional broadcast channels that provide either general programming or more specialized programming such as news, sports, weather, movies, cooking, nature, history, shopping and other educational, commercial and entertainment related programming. In addition, many cable channels further provide service channels that provide local programming generated by local governments, school districts and other local interest programming. These local programming channels operate in a similar fashion to traditional program channels, to broadcast recorded programming and/or live feeds.

A broadcast cable network includes a cable distribution network that communicates cable programming from through a cable head-end to a set-top box at a subscriber location. The set-top box receives the broadcast signal from the cable head-end and tunes to the desired channel under control of a user. The set-top box can also provide support to the user for ordering video on-demand services, provide digital video recorder functionality to record, store and playback broadcast programming and to provide an electronic program guide to allow the user to browse and select programs of interest, either to watch live or to record for later playback.

The Internet has evolved to provide users with virtually instant access to many forms of information and entertainment including audio and video programming that can be streamed and/or downloaded for playback. Internet users have come to expect greater flexibility and a wider choice of programming than is available on many broadcast cable systems. While broadcast cable channels generally provide rich program content, selection of cable programming can be limited.

Further limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
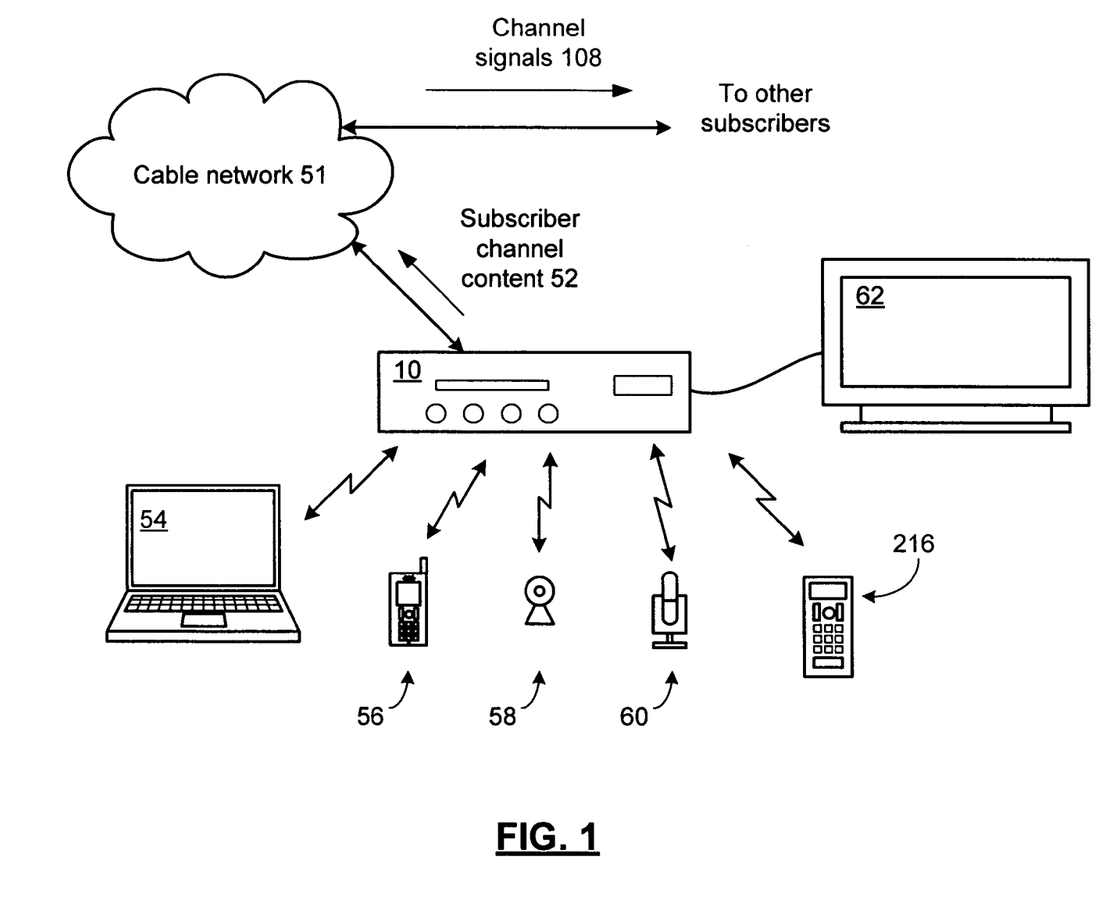
FIG. 1 presents a block diagram representation of a cable system that includes a set-top box 10 in accordance with an embodiment of the present invention.

FIG. 1 presents a block diagram representation of a cable system that includes a set-top box 10 in accordance with an embodiment of the present invention. In this embodiment, media content from at least one external device that is coupled to the set-top box 10. Examples of such external devices includes video camera 58, microphone 60, and/or desktop or portable computer 54, and wireless telephony device 56 such as a wireless telephone, that are likewise equipped with audio and video input devices. The set-top box 10 generates subscriber channel content 52, based on the media content and transfers the subscriber channel content to a cable network 51 such as a traditional broadcast cable network, broadcast satellite network, IPTV network or other broadcast video network. Cable network 51 combines the subscriber channel content with other cable channels, both tradition, and/or other subscriber channels created by other users to form channel signals 108 that are broadcast to subscribers of the cable network 51. In this fashion, the user of the set-top box 10 can produce his or her own subscriber cable channel that can be viewed by other subscribers to cable network 51 and also by the particular subscriber himself or herself as received back from the cable network 51 through the set-top box 10 and displayed on a display device 62.

In an embodiment of the present invention, the subscriber channel is created with privacy rights that restrict the access of the channel. For instance, a young family with a new baby may wish to create their own subscriber cable channel by placing a video camera and/or microphone in the baby's nursery. Access rights to the subscriber channel, such as via password, subscriber registration or other secure access technologies, could be given to the family's friends and family that subscribe to the cable network 51 to be able to view and listen to the baby and other events occurring in the nursery or as captured by the video camera and microphone.

In an alternative embodiment of the present invention, the subscriber channel can be created as a public channel, such as a standard channel, premium channel, video on demand channel or pay-per-view channel, that is available on an unrestricted basis to other subscribers of cable network 51 and/or accessed as a streaming video signal over the Internet, with or without privacy restrictions, and with or without an additional fee. For instance, a subscriber may wish to create his or her own reality television show by placing a video camera at a location in or around his home. A school may wish to place a video camera on its playground that allows subscriber to watch children at play, to monitor the weather conditions at the school. A video camera placed in the auditorium of the school can provide viewing of special events in the school such as plays and assemblies. A video camera in a class room could likewise provide viewers with access to instruction and other educational content.

Further, subscribers that are budding playrights, musicians, conductors and directors can create their own audio and video programming that is sent to the cable network 51 on a "live" basis or that may be uploaded and stored to the set-top box 52 and scheduled for transfer to the cable network 51 at selected times. In an embodiment of the present invention, a subscriber may obtain a fractional channel, corresponding to particular programming times for a subscriber channel that is shared by multiple subscribers. These fractional channel rights may be on a one-time basis (5:00-6:00 pm Eastern Standard Time on May 19$^{th}$) to schedule a one-time event such as a single broadcast of a concert, birthday party, family reunion, or to accommodate other programming such as user created music, plays, video clips, movies, etc. on either a live or recorded basis. In addition, these fractional channel rights may include periodic programming slots, such as the 15$^{th}$ of each month at 1:00 pm-3:00 pm, every Tuesday from 6:30 pm-7:00 pm, etc.

In one mode of operation, the option of obtaining a subscriber channel (including fractional channel rights as described above) can be a fee-based service of the cable network 51. Subscribers wishing to generate their own subscriber channel could pay a periodic fee to the cable network such as a monthly or annual fee, or a on-time use fee to obtain channel rights for either a dedicated channel, fractional channel or one-time use of a subscriber channel. In an embodiment of the present invention, the fee charged (if any) can be based in whole or in part on factors such as full versus fractional use, the amount of time used, the placement of the channel in the channel lineup, optional rights to name the channel, whether the channel is private or public, the type of optional privacy restrictions, whether ads are allowed, whether the ads generate revenue to the subscriber or to the cable company, the time of day or time of week of the fraction channel rights, etc. In addition or in the alternative, the subscribers that view the subscriber channel, either singly or together with a group of other subscriber channels or other channels can be charged to view the channel in a manner similar to a video-on-demand, pay-per-view broadcast or premium channel. All or a portion of the fees collected from other viewers of the subscriber channel could be remitted to the subscriber as revenue or used to offset some or all of the cost to the subscriber for the subscriber channel, etc.

The media content can be in the form of one or more video signals, audio signals, multimedia signals or other media signals that are either realtime signals in analog or digital format or data files that contain media content in a digital format. For instance, the media content can be transferred as in a broadcast video signal, such as a television signal, high definition televisions signal, enhanced high definition television signal or other broadcast video signal that has been transmitted over a wireless medium, either directly or through one or more satellites or other relay stations or through a cable network, optical network or other transmission network. Further, the media content can be included in a digital audio or video file, transferred from a storage medium such as a server memory, magnetic tape, magnetic disk or optical disk, or can be included in a streaming audio or video signal that is transmitted over a public or private network such as a wireless or wired data network, local area network, wide area network, metropolitan area network or the Internet.

Set-top box also functions in a standard fashion to optionally play audio and video programming provided by cable network 51. Display device 62 can include a television, monitor, computer, handheld device or other video display device that creates an optical image stream either directly or indirectly, such as by optical transmission or projection, and/or that produces an audio output from media content.

Set-top box 10 can receive user commands and other user initiated signaling via remote control device 216 that communicates with the set top box via infrared or other wireless signaling. In an embodiment of the present invention, set-top box includes a graphical user interface that operates in conjunction with display device 62 and remote control device 216 to provide set-up, selections and control regarding the set-up and operation of the subscriber channel, to receive other user commands and selections in conjunction with the standard set top box functionality and to provide other selections, commands and other data inputs that are specific to the one or more features of the present invention. Further, a subscriber can customize their subscriber channel via the Internet and either via a Web browser or email using wireless telephone 56, personal computer 54, a personal digital assistant or other Internet communication device. The subscriber would access a network server that is coupled to cable network 51 that allows them to customize the look-and-feel of their subscriber channel and do things such as, modify the background color, font color, determine placement of certain items on the screen (ie. live video feeds, etc.), insert certain "widgets" into the channel such as video from other websites, blogs, RSS feeds, etc. The output of their customization work on the network server would then be coupled to the head-end system or other portion of cable network 51 and injected into the subscriber channel. The updates to the subscriber channel could take place either in real-time or on-demand.

In an embodiment of the present invention, set-top box 10 includes a wired link for coupling to external device 54, 56, 58, 60, etc. to transfer one or more streaming audio or video signals or digital audio or video files that contain the media content 52. The coupling can include a serial or parallel connection such as a, Ethernet connection, Universal Serial Bus (USB) connection, an Institute of Electrical and Electronics Engineers (IEEE) 1394 (Firewire) connection, small computer serial interface (SCSI) connection or other wired connection that operates in accordance with either a standard or custom interface protocol. In this fashion, external devices such as desktop or portable computer 54, wireless telephony device 56, video camera 58, microphone 60 or other external devices can be coupled to set-top box to send live digital or analog video or audio signals, digital video streams, and/or compressed digital audio and/or video files to the set-top box 10, either automatically or by command from one or the other of these external devices or set-top box 10.

In another embodiment of the present invention, the set-top box includes a wireless link for coupling to one or more of the external devices 54, 56, 58, 60, etc. that operates in accordance with a wireless network protocol such as 802.11a,b,g,n (referred to generically as 802.11x), Bluetooth, Ultra Wideband (UWB) or other wireless connection that operates in accordance with either a standard or custom interface protocol in order to transfer media content from one or more of these external devices.

In a further embodiment, the set-top box includes a removable memory, such as a removable drive, disk or memory card. In this fashion, the removable memory can be written with a compressed digital audio or video file that contains the media content by an external device and read when inserted in a card slot, drive bay, disk drive or other coupling of the set-top box 10 for storage and/or transfer to the cable network 51 as subscriber channel content 52.

Further details regarding the present invention including alternative embodiments, optional implementations, functions and features are presented in conjunction with FIGS. 2-10 that follow.

Figure 2:
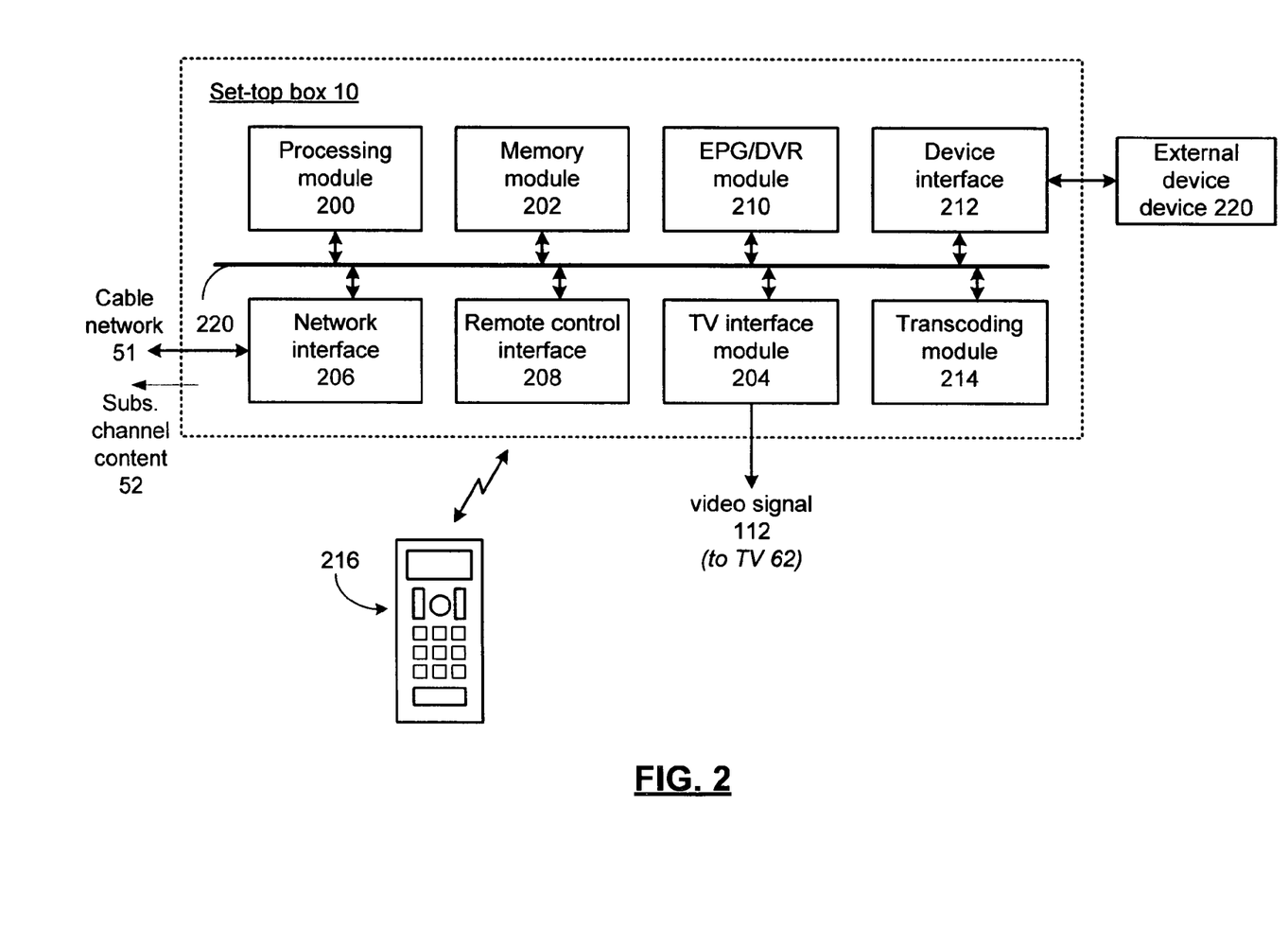
FIG. 2 presents a block diagram representation of a set-top box 10 in accordance with an embodiment of the present invention.

FIG. 2 presents a block diagram representation of a set-top box 10 in accordance with an embodiment of the present invention. In particular, set-top box 10 includes a device interface 212 for coupling to at least one external device 220, such as external devices 54, 56, 58, 60 or other external devices, a network interface 206 for coupling to cable network 51, a television interface module 204 for coupling to a television including a television monitor, a remote control interface 208 that receives user initiated signaling from a remote control device 216, a processor 200 that operates in accordance with a open cable application platform or other operating system layer that runs an application in accordance with the present invention. In addition, set-top box 10 include a data bus 220, memory module 202, electronic program guide (EPG)/digital video recorder (DVR) module 210, and transcoding module 214.

In general, a video signal transferred from the cable network 51 to the set-top box can include an analog video signal that is formatted in any of a number of video formats including National Television Systems Committee (NTSC), Phase Alternating Line (PAL) or Sequentiel Couleur Avec Memoire (SECAM). Further, such signals can be in a digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary. In an embodiment of the present invention, the connection between cable network 51 and set-top box 10 includes a Data Over Cable Service Interface Specification (DOCSIS) link that allows data, including subscriber channel content 52 to be transmitted by set-top box 10 to the cable network 51.

In an embodiment of the present invention, processing module 200, via software, hardware or firmware, operates in accordance with a open cable application platform (OCAP) operating system layer that runs an application that executes many of the various method steps attributed to the set-top box 10 as described herein. In particular, the processor receives media content from at least one external device via the device interface 212, and generates subscriber channel content 52 based on the media content and transfers the subscriber channel content 52 to the cable network 51 via the network interface 206 to produce a subscriber cable channel. In addition, the application operates to receive a plurality of selections from a user relating to the production of the subscriber cable channel and to transfer the plurality of selections to the cable network via the network interface.

Further, television interface module 204 produces video signal 112 to produce a display on a display device such as display device 62 to display one or more broadcast channels provided by cable network 51. In addition, the remote control interface 208 is coupled to receive user initiated signaling from a remote control device 216. The application is further operable to generate a display on the television that prompts a user with a plurality of options and to receive a response from the user via the user initiated signaling that includes the plurality of selections, as well as other command and control information.

Video signal 110 and the media content received from an external device can include an analog video signal that is formatted in any of a number of video formats including National Television Systems Committee (NTSC), Phase Alternating Line (PAL) or Sequentiel Couleur Avec Memoire (SECAM) or in a digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital format, either standard or proprietary.

Processing module 200 can be implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

The other modules of set-top box 10 can be implemented in software, firmware or hardware, depending on the particular implementation of processing module 200. It should also be noted that the software implementations of the present invention can be stored on a tangible storage medium such as a magnetic or optical disk, read-only memory or random access memory and also be produced as an article of manufacture.

Memory module 202 can store the application, user selections, preferences and other data, the operating system, other software and firmware, and additionally, can store a plurality of compressed video files corresponding to instances of the media content and/or the subscriber channel content 52. As discussed above, the memory module 202 can include a plurality of different memory devices. In an embodiment of the present invention, the plurality of compressed video files are stored in a large capacity storage medium such as a hard disk drive or flash memory, however other memory devices may likewise be used, and in particular, a removable memory device can be used to store the compressed video files in instances where the media content is transferred from one or more external devices via such a removable memory.

In operation, transcoding module 214 can encode the audio/video signals such as video signal 110 or other input signal from cable network 51 into a digital file format for storage in memory module 202 and/or to encode media content from the particular media format used by external device 220 such as one or more of the external devices 54, 56, 58, and 60 to another format, such as a digital video format used to store or transfer the subscriber channel content 52. This encoding can include transcoding, transrating and other conversion from a one media format to one or more additional media formats.

EPG/DVR module 210 includes an electronic program guide that allows a user, through operation of user interface module 212 and one or more user interface devices 214 to obtain information regarding current or upcoming programs that can be viewed, downloaded or recorded. In an embodiment of the present invention, EPG/DVR module 210 includes digital video recorder functionality that operates in conjunction with memory module 202 to record, store, select, and playback the media content and broadcast video content from cable network 51. In operation of EPG/DVR 210, a user can establish playback and record settings and preferences, interactively choose programs to record, select stored programs for playback, to pause, fast forward and rewind playback of compressed video files and buffered live video streams used to generate the processed video signal 112.

In an embodiment of the present invention, display device 62 includes a display, such as a separate liquid crystal, plasma or other display device capable of displaying text and/or graphics. The application, the electronic program guide and the digital video recorder can generate overlay text, and graphics such as one or more menus to implement a menu driven graphical user interface that is presented on processed video signal 112 for display on display device 62. Through operation of the remote control device 216 or other pointing, indication or other user interface device, the user can select different choices or preferences, browse and select from a plurality of menus and/or otherwise interact with the application and the electronic program guide and digital video recorder in order to control the operation of the set-top box 10.

While TV interface module 204 has been described in terms of being coupled to a single display device 62, TV interface module 204 can likewise include multiple interfaces for coupling to two or more video display devices, with potentially different formats and through potentially different interfaces such as component video, S-video HDMI, RF video jack or other video interface connection. Device interface 212 can include a removable memory device such as a memory card, writeable disk drive, and/or a wireless or wired communication link such as a wireless local area network interface, a wireless personal area network interface, an Ethernet port, a parallel port, a serial port, a small computer systems interface port, a IEEE 1394 compliant interface, and a universal serial bus interface or other connection.

While a particular architecture is described above, other architectures including alternative bus architectures, and architectures where the functionality of bus 220 is replaced by one or more direct connections or links, can likewise be implemented.

While described as a set-top box, any or all of the functions and features of set-top-box 10 can similarly be performed by a personal computer coupled to cable network 51 either directly or through one or more other networks, public or private, such as the Internet.

Figure 3:
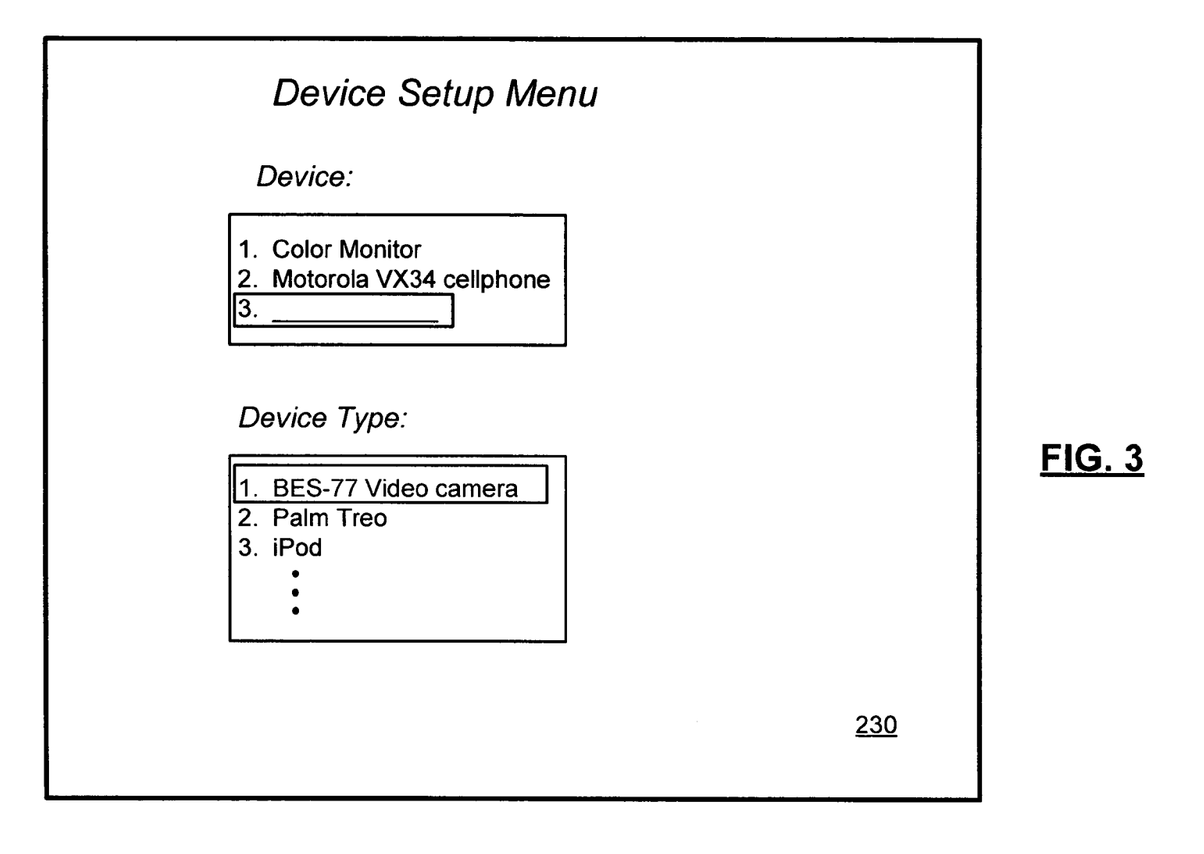
FIG. 3 presents a pictorial representation of a screen display 230 in accordance with an embodiment of the present invention.

FIG. 3 presents a pictorial representation of a screen display 230 in accordance with an embodiment of the present invention. In particular a screen display is presented as part of a user interface generated by set-top box 10 for display on display device 62 or other display device. This interactive screen can be navigated and selections can be made by the user through the use of the remote control device 216. In particular a device set-up menu is presented that allows a user to identify the particular devices or devices that could be coupled to the set-top box 10 for play, playback or downloading of content, such as media content sent to the set-top box 10 to generate subscriber channel content 52 or to send from the set-top box 10 to one or more of the external devices for their own play, playback or downloading.

In this case, the user has selected a particular color monitor and cellphone as two devices associated with set-top box 10. The user is in the process of selecting his or her third device from the list, in this case, a particular model of video camera. As shown, the user is allowed to choose the particular devices associated with the set-top box 10 from a list of possible devices. In addition, in other screens, the user can identify additional parameters of these devices including analog video format, digital video format parameters such as screen resolutions, compression depth and other format (such as a Motion Picture Experts Group (MPEG) format (such as MPEG1, MPEG2 or MPEG4), Quicktime format, Real Media format, Windows Media Video (WMV) or Audio Video Interleave (AVI), h.264 or another digital video format, either standard or proprietary), a particular port or link that will be used to couple each device to the set-top box 10, and/or other settings for each corresponding device.

The information discussed above pertaining to the associated devices can be stored in a device file in memory 202. In response to this set-up, set-top box 10 can optionally load the necessary drivers to interoperate with each of these external devices via one or more device interfaces 212.

Figure 4:
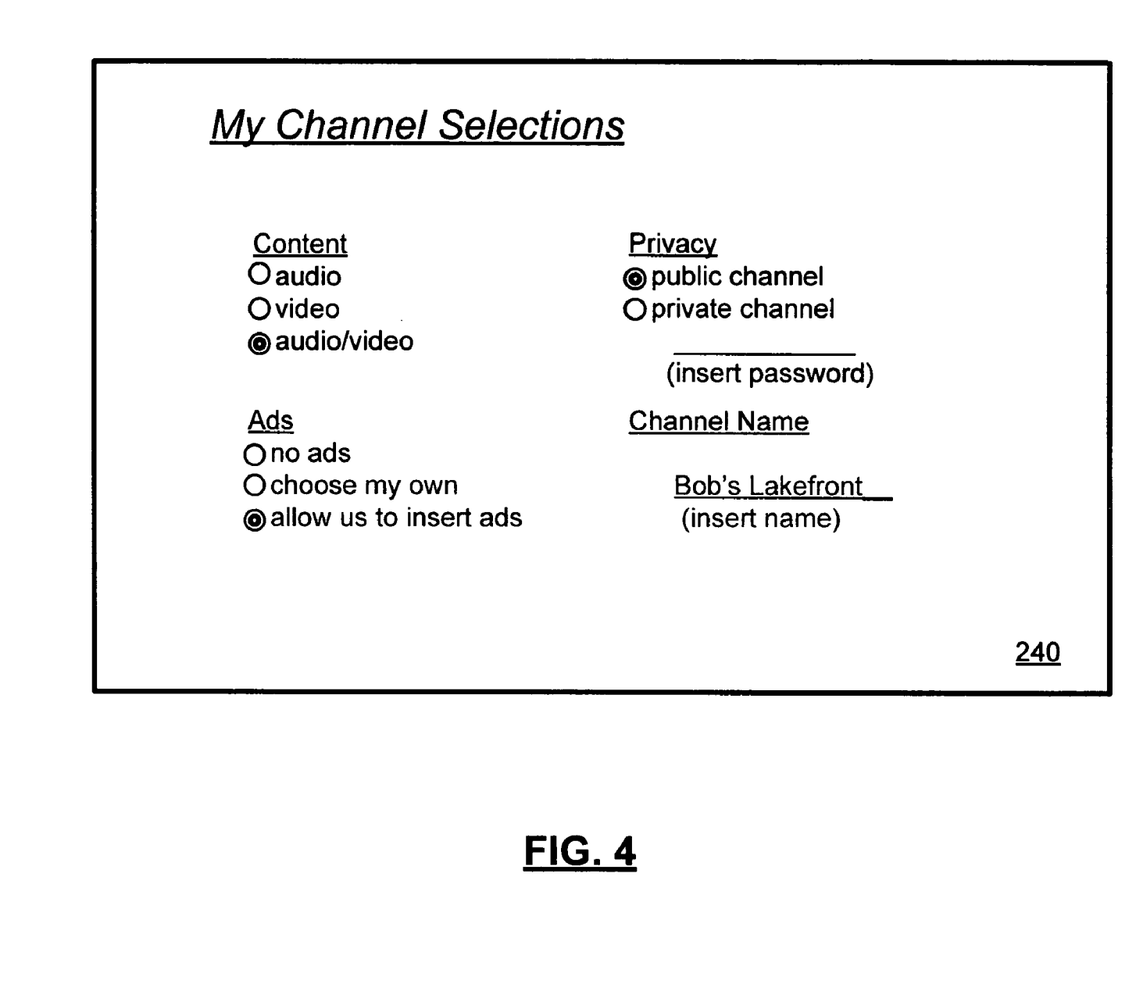
FIG. 4 presents a pictorial representation of a screen display 240 in accordance with an embodiment of the present invention.

FIG. 4 presents a pictorial representation of a screen display 240 in accordance with an embodiment of the present invention. In particular a screen display is presented as part of a user interface generated by set-top box 10 for display on display device 62 or other display device. This interactive screen can be navigated and selections can be made by the user through the use of the remote control device 216. In this screen, a plurality of selection options are presented to the user that pertain to the set-up of the user's own subscriber channel. These selections include a content selection such as audio-only, video-only or audio/video content selections. A channel name can be entered, in this case "Bob's Lakefront". The selections further include an option that no ads be inserted, for the user to choose ads to be inserted in the subscriber cable channel or for allowing the cable network to choose the ads to be inserted.

In addition, the selections can include a privacy option to restrict access to the subscriber cable channel, that can further include a password to be used by subscribers to gain access to the channel or options to make the subscriber channel a public channel that can be accessed by other subscribers without privacy restrictions.

Figure 5:
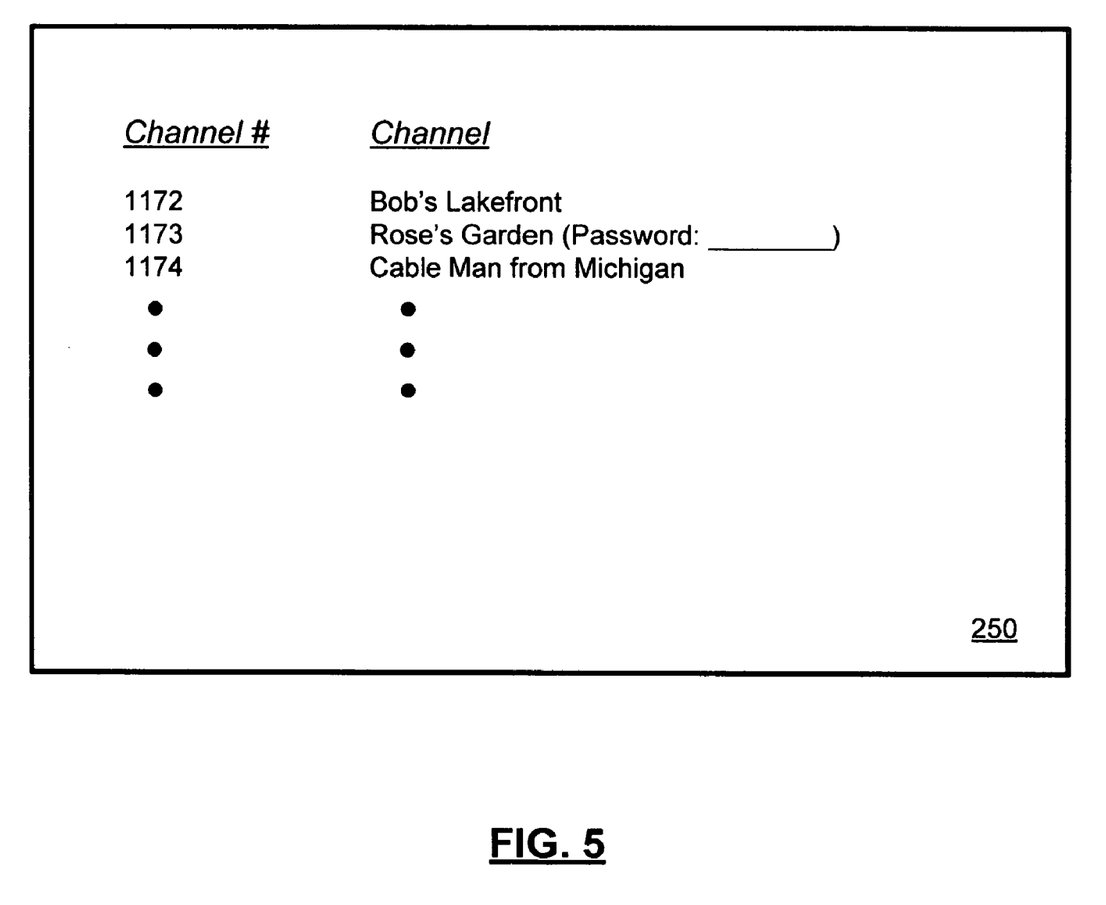
FIG. 5 presents a pictorial representation of a screen display 250 in accordance with an embodiment of the present invention.

FIG. 5 presents a pictorial representation of a screen display 250 in accordance with an embodiment of the present invention. In particular a screen display is presented as part of a user interface generated by set-top box 10 for display on display device 62 or other display device. This interactive screen can be navigated and selections can be made by the user through the use of the remote control device 216. In this screen a channel lineup is shown that includes several subscriber channels along with optionally other standard cable channels (not shown). In this case the subscriber channel named in the previous screen is showed in the channel lineup as being assigned channel number 1172. As a public channel, this channel can be accessed by subscribers as a standard channel to view the subscriber channel content provided by the user of set-top box 10. In this example, channel 1173, "Rose's Garden" is a subscriber channel that has been established with privacy rights that allow access only by those subscribers that know the password that has been established for this particular channel.

It should be noted that the screen displays shown in FIGS. 3-5 illustrate only some examples of the many optional features of the present invention as described herein.

Figure 6:
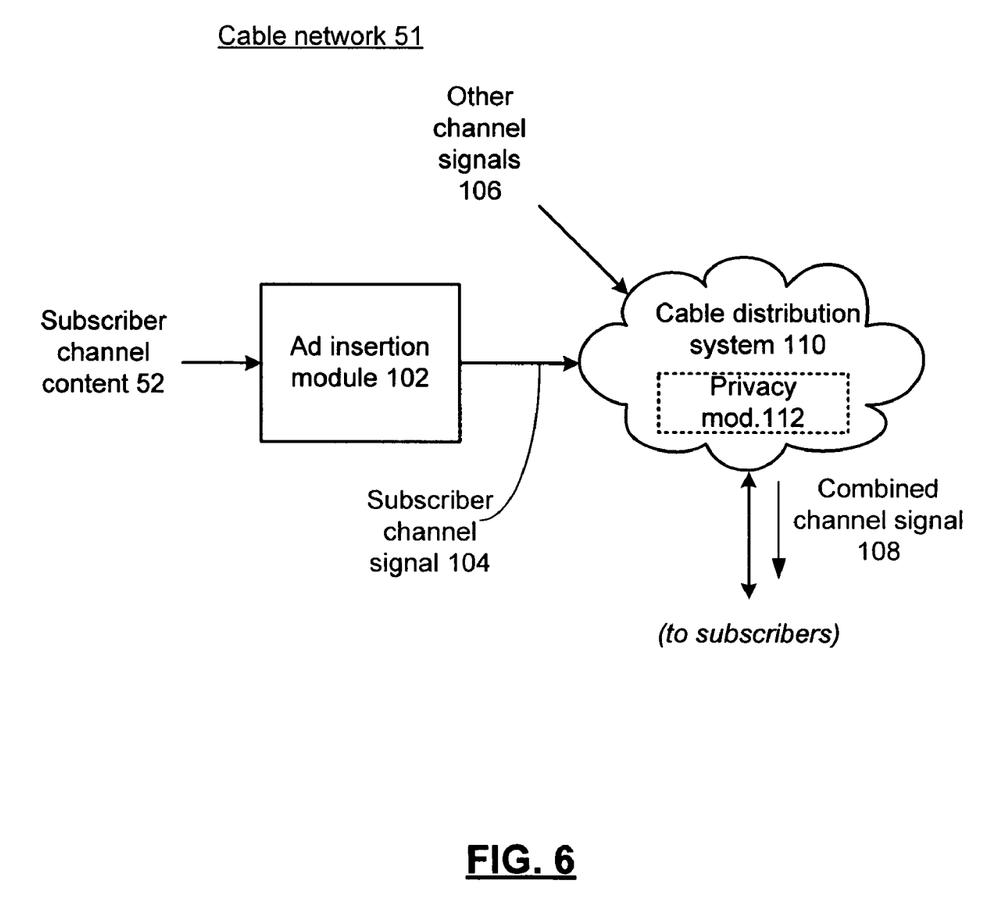
FIG. 6 presents a block diagram representation of portions of a cable network 51 in accordance with an embodiment of the present invention.

FIG. 6 presents a block diagram representation of portions of a cable network 51 in accordance with an embodiment of the present invention. In particular, cable network 51 includes an ad insertion module 102 that receives the subscriber channel content 52 and optionally inserts selected advertisements to form subscriber channel 104. As discussed in conjunction with FIG. 1, the ads can be selected by the user, with optionally some or all of the ad revenue collected by the cable company in association with the insertion of these ads being credited to the subscriber that provides the subscriber channel content 52. In a further mode of operation, the ad insertion module 102 can insert ads, if allowed by the subscriber that provides the subscriber channel content 52, again, with some or all of the ad revenue collected by the cable company in association with the insertion of these ads being optionally credited to this subscriber. The inserted ads can be standard commercials, more extended ads such as infomercials, text overlays, banner ads or other ad structures, such as advertisements for one or more products or services.

Cable distribution system 110 combines the subscriber channel signal 104 with other channel signals 106, such as standard cable channels and/or other subscriber channels to create a combined channel signal 108 for distribution to subscribers. In an embodiment of the present invention, the cable distribution system 1 10 includes a privacy module 112 that enforces the optional privacy restrictions, such as password entry or other restriction mechanisms, placed on certain subscriber channels, as selected by their respective channel creators.

Figure 7:
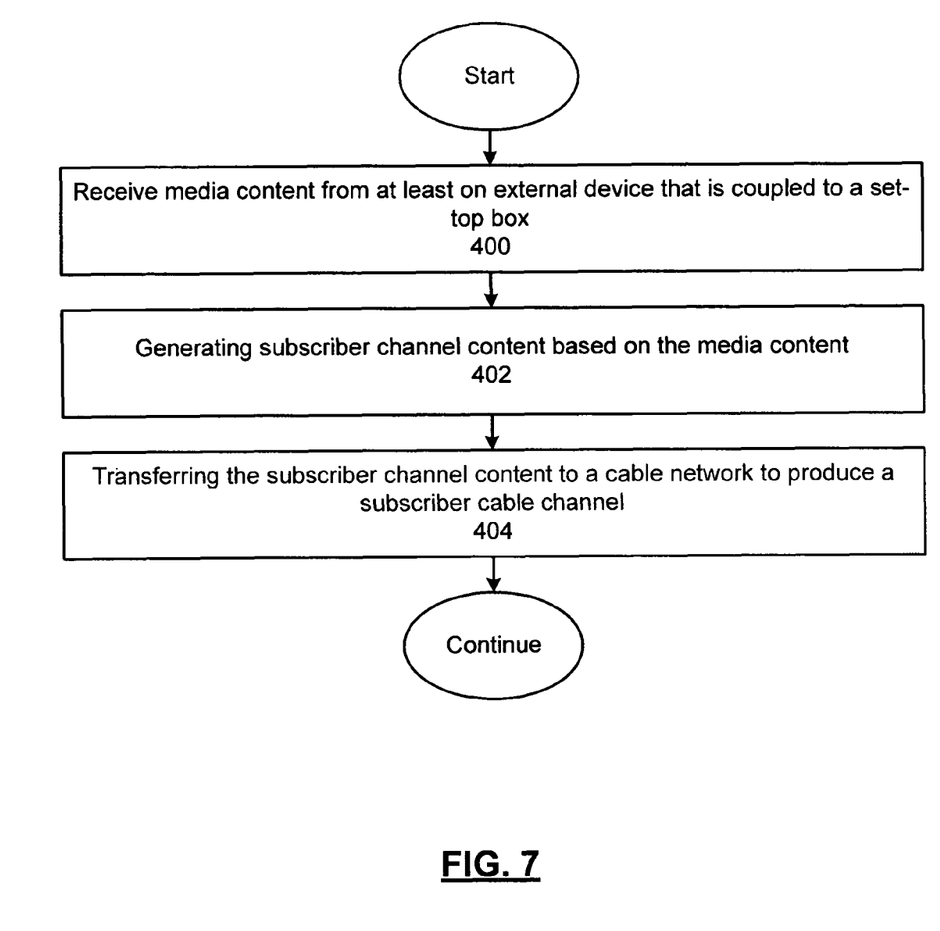
FIG. 7 presents a flowchart representation of a method in accordance with an embodiment of the present invention.

FIG. 7 presents a flowchart representation of a method in accordance with an embodiment of the present invention. In particular, a method is presented for use in conjunction with one or more of the features and functions described in association with FIGS. 1-6. In step 400, media content is received from at least one external device that is coupled to the set-top box. In step 402, subscriber channel content is generated based on the media content. In step 404, the subscriber channel content is transferred to a cable network to produce a subscriber cable channel.

Figure 8:
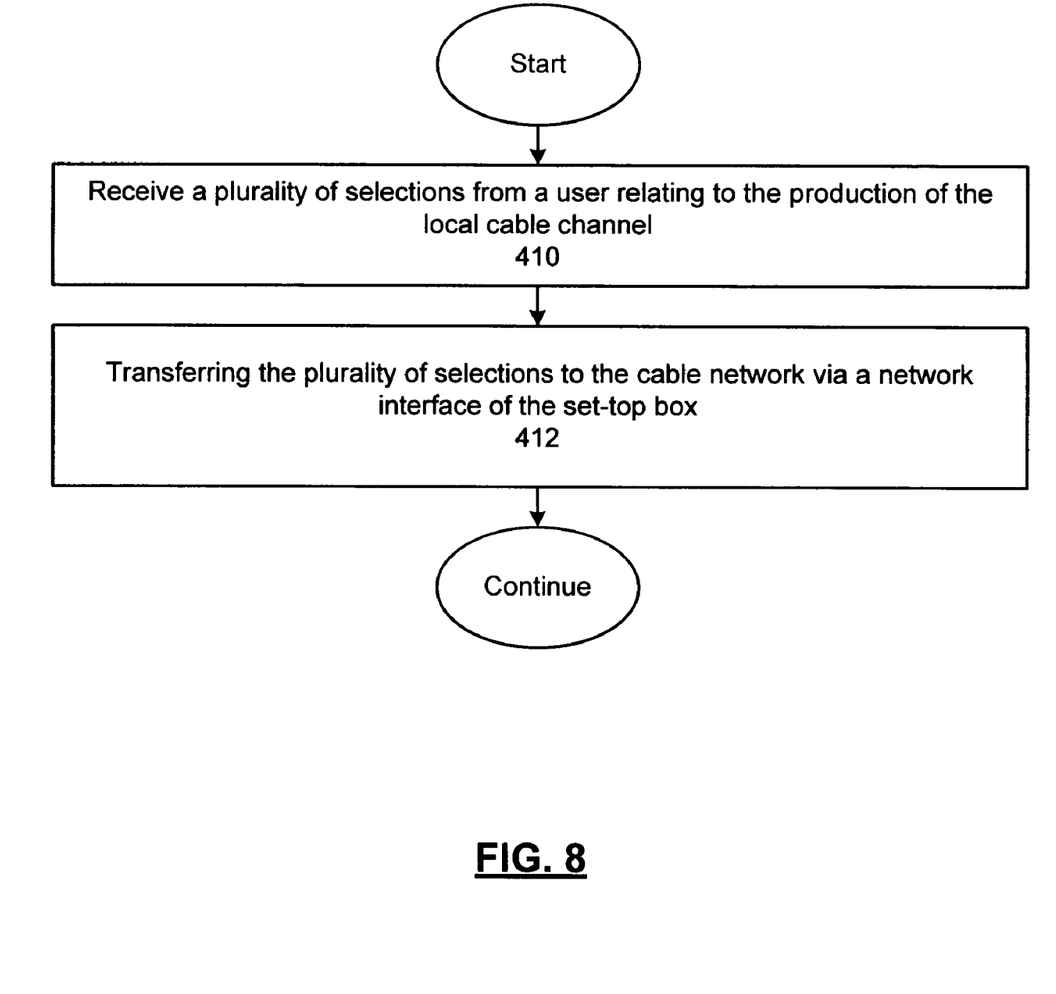
FIG. 8 presents a flowchart representation of a method in accordance with an embodiment of the present invention.

FIG. 8 presents a flowchart representation of a method in accordance with an embodiment of the present invention. In particular, a method is presented for use in conjunction with one or more of the features and functions described in association with FIG. 7. In step 410, a plurality of selections are received from a user relating to the production of the subscriber cable channel. In step 412, the plurality of selections are transferred to the cable network via a network interface of the set-top-box.

These selections can include: a media content selection that includes at least one of audio content, and video content; a channel name; an option for the user to choose ads to be inserted in the subscriber cable channel; an option for the user to allow ads to be inserted in the subscriber cable channel by the cable network; an option for the user to disallow ads in the subscriber cable channel; and a privacy option to restrict access to the subscriber cable channel, such as by password and a password selection.

Figure 9:
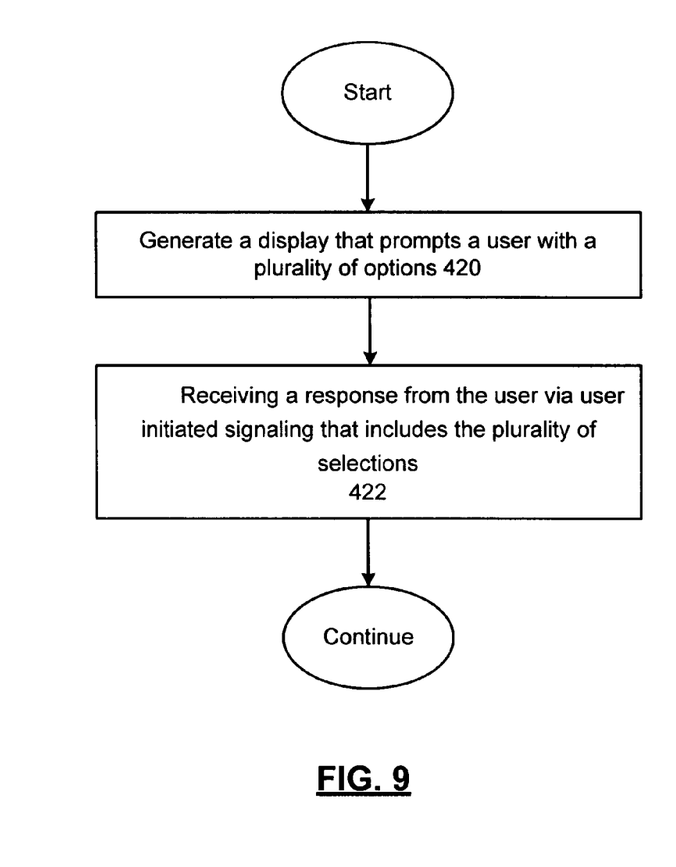
FIG. 9 presents a flowchart representation of a method in accordance with an embodiment of the present invention.

FIG. 9 presents a flowchart representation of a method in accordance with an embodiment of the present invention. In particular, a method is presented for use in conjunction with one or more of the features and functions described in association with FIG. 7. In step 420, a display is generated on a television that prompts a user with a plurality of options. In step 422, a response is received from the user via user initiated signaling that includes the plurality of selections.

Figure 10:
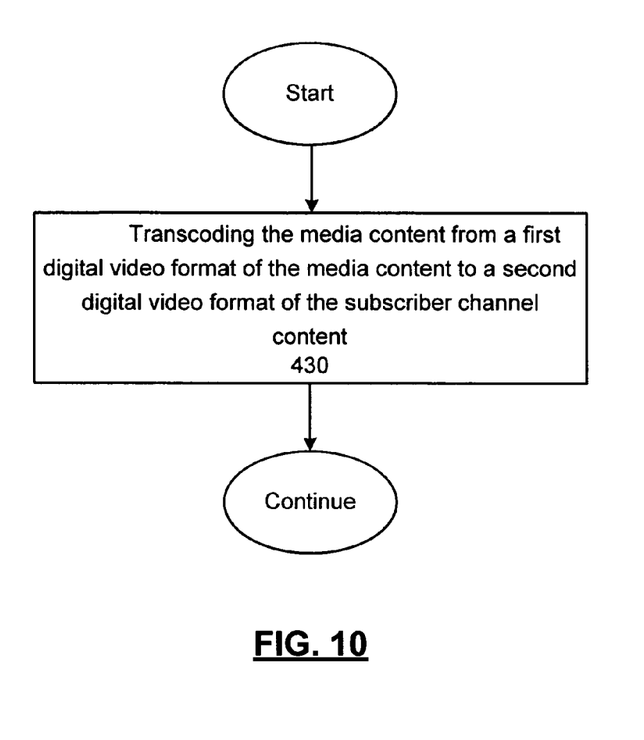
FIG. 10 presents a flowchart representation of a method in accordance with an embodiment of the present invention.

FIG. 10 presents a flowchart representation of a method in accordance with an embodiment of the present invention. In particular, a method is presented for use in conjunction with one or more of the features and functions described in association with FIG. 7. In step 430, the media content is transcoded from a first digital video format to a second digital video format of the subscriber channel content.

In an embodiment embodiment, one or more modules of the present invention can be implemented with circuits using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a home gateway device, set-top box and/or other device facilitating the production of a subscriber channel in a network, such as a cable network or other network. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A set-top box comprising:
   a device interface for coupling to at least one external device;
   a network interface for coupling to a cable network; and
   a processor, coupled the device interface and the network interface that operates in accordance with an open cable application platform operating system layer that runs an application that includes the following steps:
   receiving media content from the at least one external device via the device interface;
   generating subscriber channel content based on the media content in response to actions of a user; and transferring the subscriber channel content to a cable headend of the cable network via the network interface to produce a broadcast subscriber cable channel that is broadcast to other cable subscribers;

receiving a plurality of selections from the user relating to the production of the broadcast subscriber cable channel, the plurality of selections including an indication of whether to allow advertisements to be inserted in the broadcast subscriber cable channel at the cable network; and transferring the plurality of selections to the cable network via the network interface.

2. The set-top box of claim 1 wherein the plurality of selections include a media content selection that includes at least one of audio content, and video content.

3. The set-top box of claim 1 wherein the plurality of selections include channel name.

4. The set-top box of claim 1 wherein the plurality of selections include an option for the user to choose ads to be inserted in the broadcast subscriber cable channel.

5. The set-top box of claim 1 wherein the plurality of selections include an option for the user to allow ads to be inserted in the broadcast subscriber cable channel by the cable network.

6. The set-top box of claim 1 wherein the plurality of selections include an option for the user to disallow ads in the broadcast subscriber cable channel.

7. The set-top box of claim 1 wherein the plurality of selections include a privacy option to restrict access to the broadcast subscriber cable channel.

8. The set-top box of claim 7 wherein the privacy option includes a user password selection to allow subscriber access to the broadcast subscriber cable channel.

9. The set-top box of claim 1 further comprising:
a television interface, coupled to the processor, for coupling to a television;
a remote control interface, coupled to the processor, for receiving user initiated signaling via a remote control device;
wherein the application is further operable to:
generate a display on the television that prompts a user with a plurality of options; and
receive a response from the user via the user initiated signaling that includes the plurality of selections.

10. The set-top box of claim 1 wherein the at least one external device includes at least one of: a desktop computer, a portable computer, a video camera, a microphone, and a wireless telephone.

11. The set-top box of claim 1 wherein the media content is formatted in a first digital video format and the set-top box further includes:
a transcoding module, coupled to the device interface and the processor, that transcodes the media content to a second digital video format of the subscriber channel content.

12. The set-top box of claim 1 wherein the broadcast subscriber cable channel is one of, a premium channel, and a pay-per-view channel.

13. A method for use in a set-top box, the method comprising:
receiving media content from at least one external device that is coupled to the set-top box;
generating subscriber channel content based on the media content in response to actions of a user, wherein the generation of the subscriber channel content includes transcoding the subscriber channel content from a first digital video format into a second digital video format of a cable network; and
transferring the subscriber channel content to the cable network to produce a subscriber cable channel for transfer to other cable subscribers via a cable headend;
receiving a plurality of selections from the user relating to the production of the subscriber cable channel, the plurality of selections including the selection of at least one advertisement to be inserted in the subscriber cable channel via the cable network; and
transferring the plurality of selections to the cable network via a network interface of the set-top-box.

14. The method of claim 13 wherein the plurality of selections include a media content selection that includes at least one of audio content, and video content.

15. The method of claim 13 wherein the plurality of selections include channel name.

16. The method of claim 13 wherein the plurality of selections include a privacy option to restrict access to the subscriber cable channel.

17. The method of claim 16 wherein the privacy option includes a user password selection to allow subscriber access to the subscriber cable channel.

18. The method of claim 13 further comprising:
generating a display on a television that prompts a user with a plurality of options; and
receiving a response from the user via user initiated signaling that includes the plurality of selections.

19. The method of claim 13 wherein the subscriber cable channel is one of, a premium channel, a pay-per-view channel and a video-on-demand channel.

20. The method of claim 13 further comprising:
receiving a plurality of subscriber channel preferences; and
applying the plurality of subscriber channel preferences to the subscriber cable channel.

21. The method of claim 20 wherein the plurality of subscriber channel preferences are received via the Internet.

22. The method of claim 20 wherein the plurality of subscriber channel preferences are received via the cable network.

* * * * *